United States Patent
Koh et al.

(10) Patent No.: US 9,963,632 B2
(45) Date of Patent: May 8, 2018

(54) QUANTUM DOT-RESIN NANOCOMPOSITE AND METHOD OF PREPARING SAME

(71) Applicant: SAMSUNG ELECTRONICS CO., LTD., Suwon-si, Gyeonggi-do (KR)

(72) Inventors: Haeng Deog Koh, Hwaseong-si (KR); Hyun A Kang, Suwon-si (KR); Eun Joo Jang, Suwon-si (KR); Na Youn Won, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 44 days.

(21) Appl. No.: 14/308,506

(22) Filed: Jun. 18, 2014

(65) Prior Publication Data

US 2015/0083970 A1 Mar. 26, 2015

(30) Foreign Application Priority Data

Sep. 25, 2013 (KR) .......................... 10-2013-0114044

(51) Int. Cl.
*C09K 11/02* (2006.01)
*C09K 11/08* (2006.01)
(Continued)

(52) U.S. Cl.
CPC .............. *C09K 11/02* (2013.01); *B82Y 20/00* (2013.01); *B82Y 40/00* (2013.01); *Y10S 977/774* (2013.01); *Y10S 977/83* (2013.01); *Y10S 977/896* (2013.01); *Y10S 977/90* (2013.01); *Y10S 977/952* (2013.01)

(58) Field of Classification Search
CPC ..... C09K 11/02; C09K 11/565; C09K 11/892; C09K 11/08; C09K 11/06; H01L 33/502; H01L 33/504; H01L 33/50; H01L 33/501; H01L 33/56; B82Y 20/00; B82Y 30/00; B82Y 40/00; B82Y 10/00; C01P 2004/64; C01P 2004/84; C01P 2004/80;
(Continued)

(56) References Cited

U.S. PATENT DOCUMENTS 6,872,249 B2 3/2005 Peng et al.
7,927,515 B2* 4/2011 Jang .................. C09K 11/02
252/301.4 R
(Continued)

FOREIGN PATENT DOCUMENTS

KR 1020060084668 A 7/2006
KR 1020120058842 A 6/2012
WO 2012102107 A1 8/2012

OTHER PUBLICATIONS

Brigham Young University, Coefficient of Thermal Expansion (CTE) downloaded from website (http://www.cleanroom.byu.edu/CTE_materials.phtml) on Jun. 28, 2016, 2 pages.*
(Continued)

Primary Examiner — Matthew E Hoban
Assistant Examiner — Lynne Edmondson
(74) Attorney, Agent, or Firm — Cantor Colburn LLP

(57) ABSTRACT

A quantum dot-resin nanocomposite including a nanoparticle including a curable resin and a plurality of quantum dots contacting the nanoparticle. Also, a method of preparing the nanocomposite, and a molded article including the nanocomposite.

17 Claims, 12 Drawing Sheets

(51) Int. Cl.
*H01L 33/50* (2010.01)
*B82Y 40/00* (2011.01)
*B82Y 20/00* (2011.01)

(58) Field of Classification Search
CPC ......... Y10T 428/2991; Y10T 428/2982; Y02B 20/181; H05B 33/14; Y10S 977/773
USPC ......... 252/301.36, 301.4 R, 301.35, 301.6 S; 977/774, 773, 900, 779, 830, 896; 428/403; 427/212; 313/502
See application file for complete search history.

(56) References Cited

U.S. PATENT DOCUMENTS

| | | | | |
|---|---|---|---|---|
| 8,105,507 | B2* | 1/2012 | Jang | C09K 11/02 252/301.4 R |
| 8,618,528 | B2* | 12/2013 | Gillies | B82Y 30/00 252/512 |
| 8,658,439 | B2 | 2/2014 | Jang et al. | |
| 8,664,637 | B2 | 3/2014 | Jang et al. | |
| 8,941,293 | B2* | 1/2015 | Cheon | H01L 33/501 313/498 |
| 9,082,982 | B2* | 7/2015 | Jun | C09K 11/02 |
| 9,158,149 | B2* | 10/2015 | Jung | G02F 1/1336 |
| 9,202,997 | B2* | 12/2015 | Jang | H01L 33/56 |
| 9,598,634 | B2* | 3/2017 | Jang | C09K 11/025 |
| 2003/0148544 | A1* | 8/2003 | Nie | B82Y 15/00 436/524 |
| 2006/0157686 | A1* | 7/2006 | Jang | B82Y 10/00 257/14 |
| 2007/0096083 | A1* | 5/2007 | Raravikar | B82Y 10/00 257/40 |
| 2008/0044340 | A1 | 2/2008 | Wu et al. | |
| 2009/0137172 | A1* | 5/2009 | Huang | C08K 3/0033 442/131 |
| 2010/0148156 | A1* | 6/2010 | Jang | B82Y 30/00 257/40 |
| 2011/0068321 | A1* | 3/2011 | Pickett | C09K 11/025 257/13 |
| 2011/0121260 | A1 | 5/2011 | Jang et al. | |
| 2011/0291073 | A1 | 12/2011 | Jang et al. | |
| 2012/0088845 | A1* | 4/2012 | Gonen Williams | B82Y 30/00 514/772.4 |
| 2012/0113671 | A1 | 5/2012 | Sadasivan et al. | |
| 2012/0113672 | A1* | 5/2012 | Dubrow | B82Y 20/00 362/602 |
| 2013/0075692 | A1* | 3/2013 | Naasani | C09K 11/02 257/13 |
| 2013/0334557 | A1 | 12/2013 | Uchida et al. | |
| 2015/0083970 | A1* | 3/2015 | Koh | C09K 11/02 252/301.35 |

OTHER PUBLICATIONS

Hsu et al., "Effect of Polyimide Structure and ZnO concentration on the Morphology and Characteristics of Polyimide/ZnO Nanohybrid films", 2005, Macromol. Chem. Phys, 206, pp. 291-298.*
Joumaa et al., "Synthesis of Quantum Dot-Tagged Submicrometer Polystyrene Particles by Miniemulsion Polymerization", Jan. 11, 2006, Langmuir, 22, pp. 1810-1816.*
Oxford University Press, Inc., Polymer Data Handbook, 1999, 1102 pages.*
Burke, "Solubility Parameters: Theory and Application", 1984, The American Institute for Conservation, Book and Paper Group Annual, vol. 3, 36 pages.*

* cited by examiner

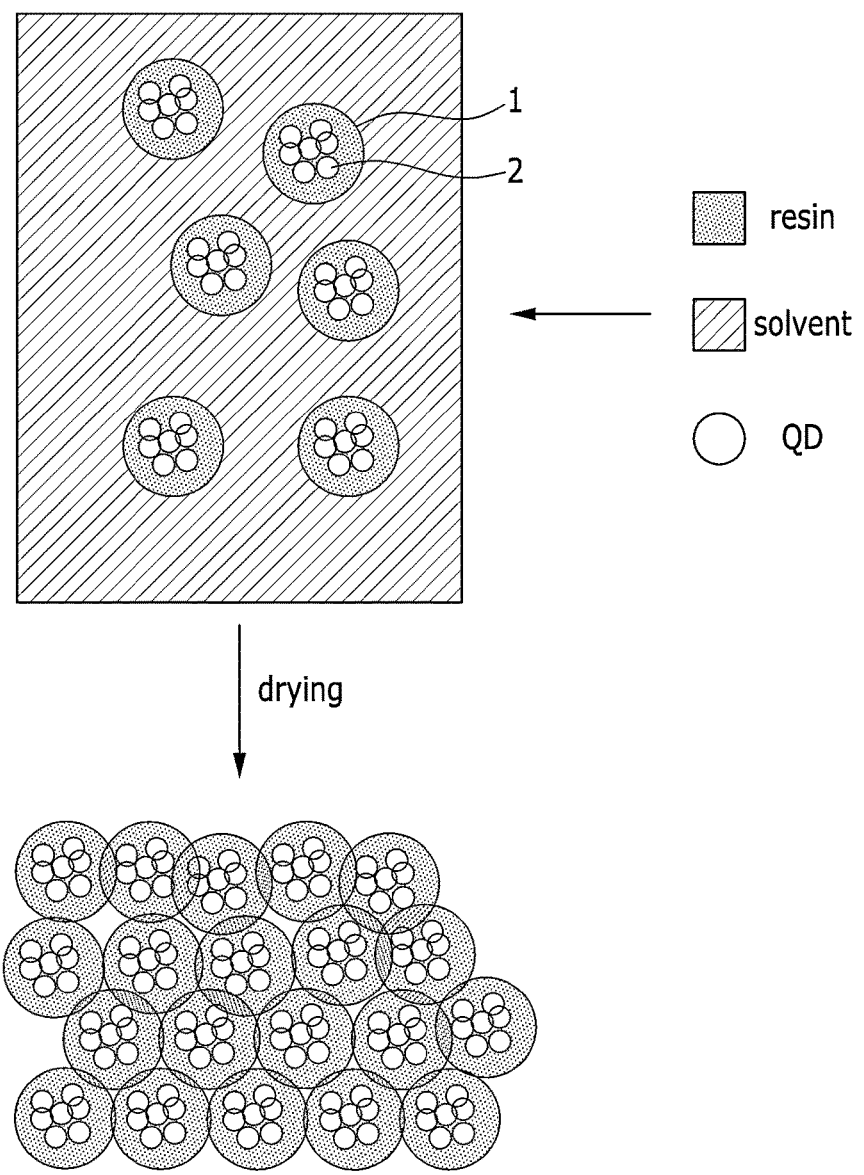

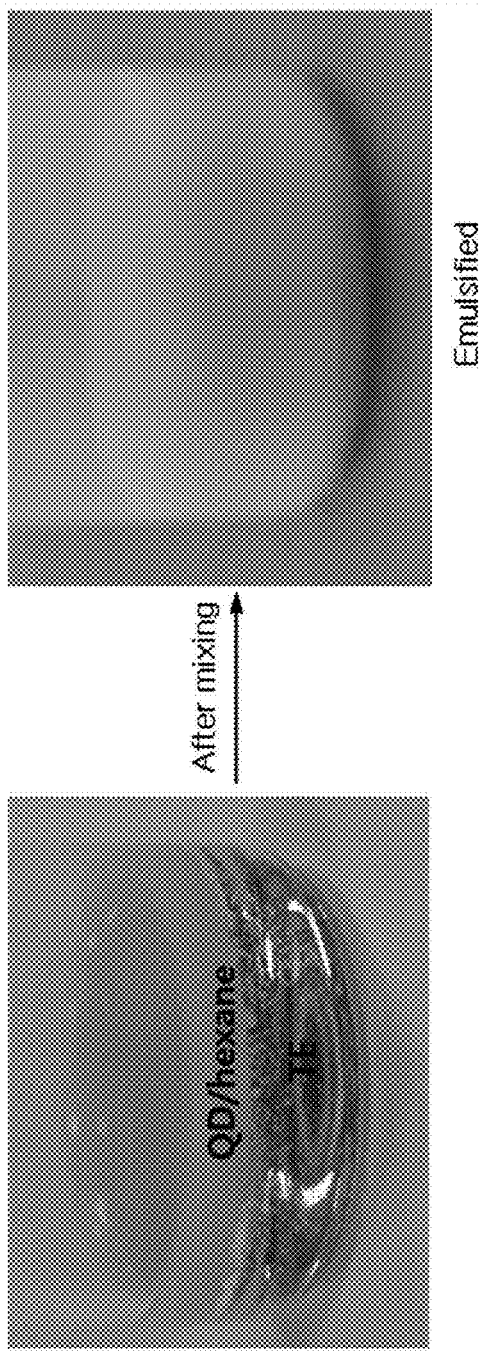

FIG.3

|  |  | Solubility parameter (Mpa)$^{1/2}$ |
|---|---|---|
| resin | TE(4T,TTT) | ~17.5 |
|  | PDMS | 15.5 |
|  | 311RM (polysiloxane/epoxy base) | ~15 |
| Solvent/ Substituents | chloroform | 18.6 |
|  | hexane | 14.9 |
|  | oleic acid | 15.5 |
|  | TOA | ~15 |

# QUANTUM DOT-RESIN NANOCOMPOSITE AND METHOD OF PREPARING SAME

CROSS-REFERENCE TO RELATED APPLICATION

This application claims priority to and the benefit of Korean Patent Application No. 10-2013-0114044, filed in the Korean Intellectual Property Office on Sep. 25, 2013, the entire content of which is incorporated herein by reference.

BACKGROUND

1. Field

A quantum dot-resin nanocomposite and a method of preparing the same are disclosed.

2. Description of the Related Art

Quantum dots (QD) are semiconductor nanocrystal particles having a size of less than or equal to about 10 nm in which the size may be freely adjusted if synthesized in a colloidal phase, and such particles may be synthesized to have a relatively uniform size distribution. In addition, when the size is decreased to less than or equal to about 10 nm, the energy density is increased by the quantum confinement effect in which the band gap is increased while decreasing the size. Accordingly, the quantum dots may have a band gap corresponding to visible light, and quantum dots having a direct band gap can provide improved luminous efficiency.

A representative application for the quantum dot, which has merits of freely controlling a wavelength within the visible ray range and having excellent light stability, includes a light emitting diode (LED). Also, the quantum dots are industrially desirable since they are variously applicable for a display device in addition to general lighting. LED devices are currently being combined with an inorganic semiconductor material, in which it is difficult to provide a white LED, so that a white color is expressed by coating a phosphor capable of down-conversion on a UV or blue LED. However, with the mainly used rare earth-doped oxide or the like, it is difficult to control the light emitting wavelength and it has low color purity. Therefore, there remains a need for an improved quantum dot.

SUMMARY

An embodiment provides a quantum dot-resin nanocomposite with enhanced structural and thermal stability.

Another embodiment provides a method of preparing a quantum dot-resin nanocomposite.

A further embodiment provides a molded article including the quantum dot-resin nanocomposite and having a decreased coefficient of thermal expansion (CTE).

According to an embodiment, a quantum dot-resin nanocomposite includes: a curable resin nanoparticle; and a plurality of quantum dots contacting the nanoparticle.

The nanocomposite may have a form in which at least one quantum dot is encapsulated in a curable resin nanoparticle; a form in which a plurality of quantum dots are coated on the surface of a curable resin nanoparticle; or a form in which a plurality of quantum dots are uniformly dispersed in a curable resin nanoparticle.

A particle diameter of the quantum dot-resin nanocomposite may be about 20 nanometers (nm) to about 5 micrometers (μm).

The curable resin may be a thermosetting resin or a photocurable resin.

The quantum dots may be coated with an organic material functionalizing the surface thereof.

The organic material functionalizing the surface of the quantum dots may be derived from RCOOH, $RNH_2$, $R_2NH$, $R_3N$, RSH, $R_3PO$, $R_3P$, ROH, RCOOR', or a combination thereof, wherein R and R' are each independently a C1-C24 alkyl group or a C5-C24 aryl group.

Specifically, the organic material coated on the surface of the quantum dots may be an organic material derived from a thiol such as methane thiol, ethane thiol, propane thiol, butane thiol, pentane thiol, hexane thiol, octane thiol, dodecane thiol, hexadecane thiol, octadecane thiol, and benzyl thiol; an amine such as methane amine, ethane amine, propane amine, butane amine, pentane amine, hexane amine, octane amine, dodecane amine, hexadecyl amine, octadecyl amine, dimethyl amine, diethyl amine, and dipropyl amine; an acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; a phosphine such as methyl phosphine, ethyl phosphine, propyl phosphine, butyl phosphine, pentyl phosphine, and the like; a phosphine compound or an oxide compound thereof such as methyl phosphine oxide, ethyl phosphine oxide, propyl phosphine oxide, butyl phosphine oxide, and the like; a diphenyl phosphine, a triphenyl phosphine compound, or an oxide compound thereof; or phosphonic acid.

According to another embodiment, a molded article including a quantum dot-resin nanocomposite having a coefficient of thermal expansion (CTE) which is decreased by greater than or equal to about 30% compared to the molded article including only a resin or a resin in which quantum dots are simply dispersed is provided.

The molded article may be a film, a substrate for a display, or a light emitting diode.

According to another embodiment, a method of preparing a quantum dot-resin nanocomposite includes: selecting an organic material to be disposed on a surface of a plurality of quantum dots, a resin, and a solvent; contacting the organic material with the surface of the quantum dots to provide functionalized quantum dots; combining the functionalized quantum dots, the resin, and the solvent, and emulsifying the same to prepare the quantum dot-resin nanocomposite.

For the solubility parameter difference, the solvent may have the highest solubility parameter; the organic material functionalizing the surface of the quantum dots may have the lowest solubility parameter; and the resin may have a solubility parameter between that of the solvent and that of the organic material functionalizing the surface of the quantum dots.

For the solubility parameter difference, the resin may have the highest solubility parameter, and the organic material functionalizing the surface of the quantum dots may have a similar solubility parameter to that of the solvent, wherein the solubility parameter of the organic material functionalizing the surface of the quantum dots may be higher than that of the solvent.

For the solubility parameter difference, the solvent may have the highest solubility parameter; and the organic material functionalizing the surface of the quantum dots may have a similar solubility parameter to that of the resin, wherein the solubility parameter of the resin may be higher than that of the organic material functionalizing the surface of the quantum dots.

The resin may be a thermosetting resin or an ultraviolet (UV) curable resin.

The organic material functionalizing the surface of the quantum dots may be derived from a compound of the formula RCOOH, $RNH_2$, $R_2NH$, $R_3N$, RSH, $R_3PO$, $R_3P$, ROH, RCOOR' (wherein R and R' are each independently a C1-C24 alkyl group or a C5-C24 aryl group), or a combination thereof.

Each of the solvent, the resin, and the organic material functionalizing the surface of the quantum dots may have a solubility parameter of between about 10 $MPa^{1/2}$ to about 30 $MPa^{1/2}$.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 1A is a schematic view showing a shape of an embodiment of a quantum dot-resin nanocomposite;

FIG. 2B shows process including the solvent and the resin together with the quantum dots, wherein the left photograph shows a first mixing state, and the right photograph shows a state in which the mixture is mechanically agitated and then allowed to stand for a predetermined time;

FIG. 3 is a table showing solubility parameters of a photocurable resin (thiolene ("TE"), polydimethylsiloxane ("PDMS"), and MINS-311RM available from Minuta Technology Co., Ltd., a vinyl acrylate-based resin "311RM") and a solvent or an organic material (chloroform, hexane, oleic acid, trioctylamine ("TOA")) for functionalizing the surface of the quantum dots;

FIGS. 5A and 5B are each an atomic force microscopic (AFM) photograph showing the film surface obtained by including the quantum dot-resin nanocomposite obtained from Example 1, wherein FIG. 5A shows a height image according to the surface height, and FIG. 5B shows a phase image showing the presence of different phases;

FIGS. 6A and 6B are each an atomic force microscopic (AFM) photograph showing the film surface obtained by including the quantum dot-resin nanocomposite obtained from Example 2, wherein FIG. 6A shows a height image according to the surface height, and FIG. 6B shows a phase image showing the presence of different phases; and FIGS. 7A and 7B is an atomic force microscopic (AFM) photograph showing the film surface obtained by including the quantum dot-resin nanocomposite obtained from Example 3, wherein FIG. 7A shows a height image according to the surface height, and FIG. 7B shows a phase image showing the presence of different phases.

DETAILED DESCRIPTION

Figure 1B:
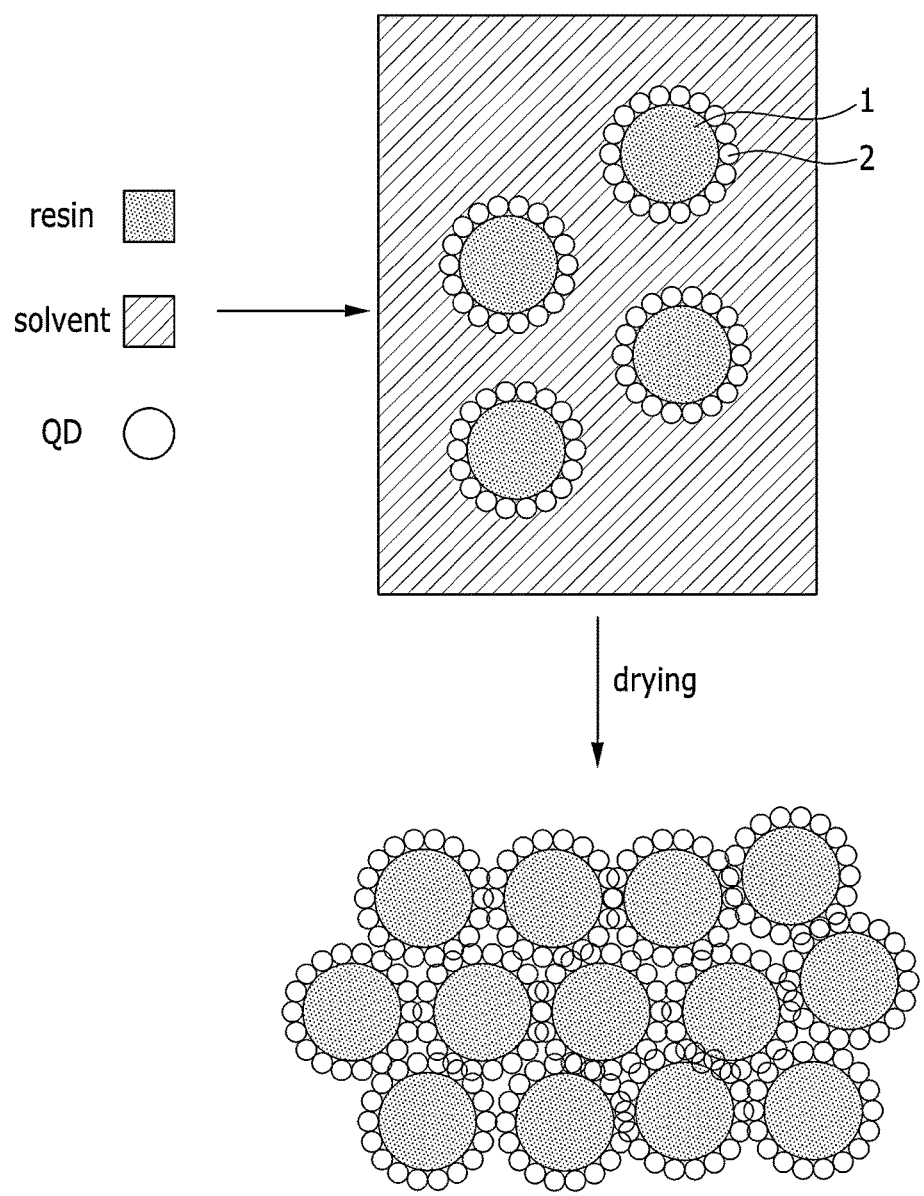
FIG. 1B is a schematic view showing a shape of another embodiment of a quantum dot-resin nanocomposite.

This disclosure will be described more fully hereinafter in the following detailed description, in which some but not all embodiments of this disclosure are described. However, this disclosure may be embodied in many different forms, and is not construed as limited to the exemplary embodiments set forth herein. Thus the disclosed embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

In an embodiment, a quantum dot-resin nanocomposite in which a curable resin nanoparticle and a plurality of quantum dots are combined nanoparticles is provided.

The nanocomposite may have a form in which at least one quantum dot is encapsulated in a curable resin nanoparticle, a form in which a plurality of quantum dots are disposed on the surface of a curable resin nanoparticle, or a form in which a plurality of quantum dots are uniformly dispersed in a curable resin nanoparticle. Thus the plurality of quantum dots contacts the curable resin nanoparticle, and the contacting may be in a configuration in which a quantum dot is on the curable resin nanoparticle or disposed within the curable resin nanoparticle.

A particle diameter of the quantum dot-resin nanocomposite may be about 20 nanometers (nm) to about 5 micrometers ($\mu$m).

Attempts have been made to provide efficiency and color purity superior to those of the currently used phosphor by using quantum dots (hereinafter referred to as "QD") as a color down-converting material of a light emitting diode (LED). The QD has a high color purity so that its theoretical quantum efficiency reaches 100% and a full width at half maximum reaches to less than or equal to 40 nm, and the QD is expected to significantly improve color reproducibility when applied to a light emitting diode compared to the currently used inorganic phosphor.

However, other inorganic phosphors comprise a particle having around a micrometer size, but the QD has a nanometer size (about 6-8 nm) causing the problem of a short life-span. So the QD still has problems to be solved for fabricating a light emitting diode using the QD in that a commercially applicable device may be developed only by providing a life-span of greater than or equal to about 30,000 hours.

In order to solve these problems, the method of fabricating a composite film and an LED chip includes randomly mixing an epoxy and a silicone resin polymer with QD nanoparticles. However, when the QD is applied for an LED, it is important for the passivation layer to be well conserved on the QD surface in order to maintain the efficiency and color reproducibility of the LED by maintaining the high efficiency and color purity of a solution phase. Currently, the method of improving the dispersion characteristics including simply mixing an encapsulation material of a polymer with a light emitting material powder or by using a dispersing agent when distributing the light emitting material in the LED chip is used. However, in the case of the colloidal QD, silicone used as an encapsulant is incompatible with an organic material on the surface of the QD, thus causing aggregation of the QD, and the organic material is lost on the surface of the QD during the process so as to deteriorate efficiency. In addition, the remaining amount of organic material is changed according to the synthesis conditions and the purification degree of the QD, so that it is difficult to accomplish reproducibility when forming a composite with the polymer. Furthermore, when the organic material is excessively removed, a surfactant of the QD surface is also removed, so the QD is rapidly separated from the passivation layer during long term driving. In addition, when the QD light emitting material is cured into a film or an LED by dispersing it in the polymer and the photo (thermal) curable resin and injecting it into a glass capillary, the glass capillary may be cracked due to the high coefficient of thermal expansion (CTE) of the polymer and resin, so the device is difficult to fabricate.

In order to solve the problem, it is desired to control the CTE value of the QD/resin structure and to optimize the compatibility (dispersion) of the QD and the resin by selecting an optimal resin having a low CTE value when fabricating a QD/resin composite, so as to prevent the aggregation of the QD and to control the QD luminance.

According to an embodiment, the QD and the resin have a form of a composite nanoparticle, so the QD may be provided in a more stable size and structure by including the resin, differing from other methods in which the QD is simply dispersed in the polymer matrix, so as to accomplish the structural stabilization of the QD and the improvement of life-span. Furthermore, the molded article including the quantum dot-resin nanocomposite decreases the coefficient of thermal expansion by greater than or equal to about 30% compared to the case of including only the resin or the case of simply dispersing the QD in the resin, so it is very preferable for use when the application is at a high temperature.

The quantum dot-resin nanocomposite according to the embodiment may be fabricated by emulsification using a solubility parameter difference among the quantum dots, the resin, and the solvent.

For example, a solvent having a highest solubility parameter, quantum dots having a lowest solubility parameter, and a resin having a solubility parameter between that of the solvent and the quantum dots are selected, mixed together, and emulsified to provide a quantum dot-resin nanocomposite.

Alternatively, for example, the quantum dot-resin nanocomposite may be fabricated by selecting a resin having the highest solubility parameter, and quantum dots and a solvent having similar solubility parameters to each other, wherein the solubility parameter of the quantum dots is higher than that of the solvent, and mixing and emulsifying the same.

Alternatively, for example, the quantum dot-resin nanocomposite may be fabricated by selecting a solvent having the highest solubility parameter, and quantum dots and a resin having a similar solubility parameter to each other, wherein the solubility parameter of the resin is higher than the solubility parameter of the quantum dots, and mixing and emulsifying the same.

Herein, the "solubility parameter of quantum dots" may be understood to mean the solubility parameter, e.g., a Hildebrand solubility parameter, of an organic material for functionalizing quantum dots.

Accordingly, the fabrication method relates to a method of preparing a quantum dot-resin nanocomposite including selecting an organic material which will be disposed on the surface of quantum dots to provide functionalized quantum dots, a resin, and a solvent to provide the organic material functionalizing the surface of the quantum dots, the resin, and the solvent with the solubility parameter difference; mixing the quantum dots functionalized with the selected organic material, the resin, and the solvent; and emulsifying the same.

The organic material functionalizing the quantum dots is a material derived from a capping agent such as an organic surfactant, a capping agent such as an amphiphilic polymer, and the like.

For example, the organic material may be a material derived from a compound of the formula RCOOH, $RNH_2$, $R_2NH$, $R_3N$, RSH, $R_3PO$, $R_3P$, ROH, RCOOR' (wherein R and R' are each independently a C1-C24 alkyl group or a C5-C24 aryl group), or a combination thereof. Specifically, the organic material may be a material derived from a thiol such as methane thiol, ethane thiol, propane thiol, butane thiol, pentane thiol, hexane thiol, octane thiol, dodecane thiol, hexadecane thiol, octadecane thiol, or benzyl thiol; an amine such as methylamine, ethylamine, propylamine, butylamine, pentylamine, hexylamine, octylamine, dodecylamine, hexadecyl amine, octadecyl amine, dimethyl amine, diethyl amine, or dipropyl amine; an acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine such as methyl phosphine, ethyl phosphine, propyl phosphine, butyl phosphine, pentyl phosphine, or the like; a phosphine compound or an oxide compound thereof such as methyl phosphine oxide, ethyl phosphine oxide, propyl phosphine oxide, butyl phosphine oxide and the like; a diphenyl phosphine, a triphenyl phosphine compound, or an oxide compound thereof; and phosphonic acid and the like, but is not limited thereof. A combination comprising at least one of the foregoing can be used.

The resin may be a thermosetting resin or an ultraviolet (UV) curable resin.

The thermosetting resin may comprise an epoxy resin, a phenolic resin, a melamine resin, a urea resin, a unsaturated polyester resin, a silicone, a polyurethane, an allyl resin and a thermosetting acrylic resin, a phenol-melamine condensation polymerization resin, a urea melamine condensation polymerization resin, and the like, and may be any suitable resin having the solubility parameter within the range. In addition, the thermosetting resin is not limited to the foregoing resins.

The ultraviolet (UV) curable resin includes a resin having a functional group such as a radical-polymerizable unsaturated group, for example, a (meth)acryloyloxy group, a vinyloxy group, a styryl group, a vinyl group, and/or a cation-polymerizable group, for example, an epoxy group, a thioepoxy group, a vinyloxy group, or an oxetanyl group. The resin may include, for example, a polyester resin, a polyether resin, a (meth)acrylic resin, an epoxy resin, a urethane resin, an alkyd resin, a spiroacetal resin, a polybutadiene resin, and a polythiolpolyene resin, but is not limited thereto.

The semiconductor nanocrystal may include a Group II-VI compound, a Group III-V compound, a Group IV-VI compound, a Group IV compound, or a combination thereof.

The Group II-VI compound may be a binary compound selected from CdSe, CdTe, ZnS, ZnSe, ZnTe, ZnO, HgS, HgSe, HgTe, MgSe, MgS, and a mixture thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be a binary compound selected from GaN, GaP, GaAs, GaSb, AlN, AlP, AlAs, AlSb, InN, InP, InAs, InSb, and a mixture thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be a binary compound selected from SnS, SnSe, SnTe, PbS, PbSe, PbTe, and a mixture thereof; a ternary element compound selected from SnSeS, SnSeTe, SnSTe, PbSeS, PbSeTe, PbSTe, SnPbS, SnPbSe, SnPbTe, and a mixture thereof; and a quaternary element compound selected from SnPbSSe, SnPbSeTe, SnPbSTe, and a mixture thereof. The Group IV compound may be a single element compound selected from Si, Ge, and a mixture thereof; and a binary compound selected from SiC, SiGe, and a mixture thereof.

The semiconductor nanocrystal may have a core-shell structure.

The semiconductor nanocrystal may adsorb light having a wavelength of about 300 nm to 500 nm, and may emit light having a wavelength of about 500 nm to about 600 nm, about 600 nm to about 700 nm, or about 550 nm to about 650 nm.

According to the solubility parameter difference, the obtained quantum dot-resin nanocomposite may have different shapes.

Herein, "solubility parameter" refers to "Hilderbrand solubility parameter ($\delta$)" which is a reference numerically evaluating interaction between materials. Particularly, the solubility parameter indicates the solubility of a nonpolar material such as many polymer materials. Materials having similar solubility parameters ($\delta$) may be miscible. The solubility parameter may be represented by a square root of cohesive energy density as illustrated in the following Equation 1.

$$\delta = \sqrt{\frac{\Delta H_v - RT}{V_m}} \qquad \text{Equation 1}$$

In Equation 1, Vm refers to a molar volume, $\Delta$Hv refers to a difference of heat of vaporization, R refers to an ideal gas constant, and T refers to absolute temperature.

"Cohesive energy density" refers to energy required to completely separate one molecule from adjacent molecules, which is the same as the value determined by dividing the heat of vaporization by the molar volume. As one molecule is separated from the same molecules and then surrounded with a solvent to solve a material, the same interactions may be overcome, accordingly Hilderbrand has suggested use of the square root of cohesive energy density as a value for showing the solubility. Materials having similar solubility parameters may interact with each other, so showing solvation, miscibility, swelling, or the like Therefore, for example, when the solvent has the highest solubility parameter, the organic material functionalizing the surface of the quantum dots has the lowest solubility parameter, and the resin has a solubility parameter between that of the solvent and that of the organic material functionalizing the surface of the quantum dots, the obtained quantum dot-resin nanocomposite may have a form in which at least one quantum dot is impregnated in the central part of the resin nanoparticle.

On the other hand, when the resin has the highest solubility parameter, and the organic material functionalizing the surface of the quantum dots and the solvent have similar solubility parameters, wherein the organic material functionalizing the surface of the quantum dots has a higher solubility parameter than that of the solvent, the obtained quantum dot-resin nanocomposite may be prepared in a form in which a plurality of quantum dots are coated on the surface of the resin nanoparticle.

In addition, when the solvent has the highest solubility parameter, and the organic material functionalizing the surface of the quantum dots and the resin have similar solubility parameters, wherein the resin has a higher solubility parameter than that of the organic material functionalizing the surface of the quantum dots, the obtained quantum dot-resin nanocomposite may be prepared in a form in which a plurality of quantum dots are uniformly dispersed in the resin nanoparticle.

In this way, the preparation method according to one embodiment may control the position of the quantum dots in the resin and the size of the quantum dot-resin nanocomposite or the like by selecting the adjusted solubility parameters of the organic material functionalizing the surface of quantum dots, the solvent, and the resin.

Each of the solvent, the resin, and the organic material functionalizing the surface of the quantum dots may have solubility parameters between about 10 MPa$^{1/2}$ and about 30 MPa$^{1/2}$, specifically about 12 MPa$^{1/2}$ and about 28 MPa$^{1/2}$, more specifically about 14 MPa$^{1/2}$ and about 26 MPa$^{1/2}$, and the suitable quantum dots, resin, and solvent may be selected and used from the solvent, the resin, and the quantum dots having the ranged solubility parameters, considering the desirable particle size and the position and distribution of quantum dots in the particle.

FIG. 1A is a schematic view showing a shape of an embodiment of a quantum dot-resin nanocomposite.

Referring to FIG. 1A, the structure is formed in which a resin is present in a form of nanoparticles in a solvent, and a plurality of quantum dot (QD) particles 2 are encapsulated in the resin nanoparticle 1. In the structure, the solvent having the highest solubility parameter is not compatible with the QD having the lowest solubility parameter, so as to be present as far as possible therefrom. In order to achieve this, the resin having a solubility parameter between that of the solvent and the QD acts as a surfactant between the solvent and the QD, and may be present in a form such that quantum dots are encapsulated at the inside thereof.

Referring to FIG. 1B, a nanoparticle-shaped resin particle is formed in a solvent and is present in a form such that a plurality of QD particles having a smaller size are coated on the surface of the resin particle. This is a form in which the QD contacts the solvent in a form of coating the resin nanoparticle since the QD and the resin have similar solubility parameters and are present near each other, but the QD has a lower solubility parameter than that of the resin and a higher solubility parameter than that of the solvent.

The quantum dot-resin nanocomposites shown in FIG. 1A and FIG. 1B are present as an emulsion in the solvent, and then become nanoparticle-shaped quantum dot-resin nanocomposites as shown in the lower diagrams of FIG. 1A and FIG. 1B, simply by removing the solvent.

Figure 2A:
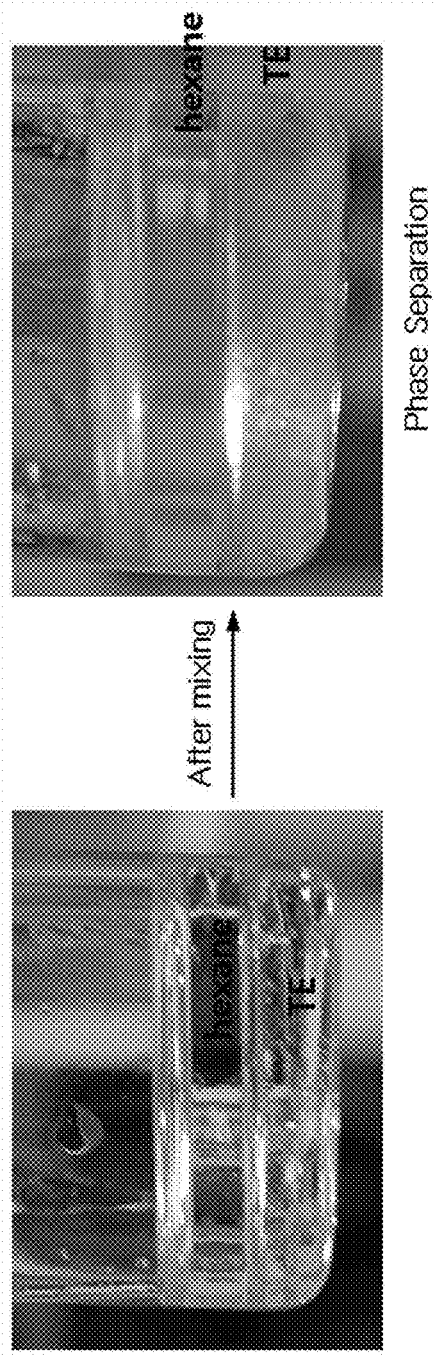
FIG. 2A show photographs comparing a process including only a solvent and a resin having a solubility parameter difference, wherein the left photograph shows a first mixing state, and the right photograph shows a state in which the mixture is mechanically agitated and then allowed to stand for a predetermined time.

FIGS. 2A and 2B show the nanocomposite as an emulsion in the solvent. FIG. 2A shows the case of mixing only the solvent and the resin before mixing the quantum dots (left) and the case of agitating and mixing the same after a predetermined time (right). In other words, FIG. 2A shows that the solvent and resin having different solubility parameters are not emulsified even when mixing them, and the solvent and the resin are phase-separated again after a predetermined time. However, as shown in the left photograph of FIG. 2B, the quantum dots are present only in the solvent initially when the quantum dots functionalize with an organic material are mixed thereto, but the phase-separation is not caused and the emulsion is maintained even if allowed to stand for a predetermined time as shown in the right photograph of FIG. 2B, by agitating and mixing them. In other words, the quantum dot-resin nanocomposite is formed and is present as an emulsion, as shown in FIGS. 1A and 1B.

FIG. 3 is a table showing the solubility parameters of the resin, the solvent and the substituents used to functionalize the surface of the quantum dots used in the examples.

From the table, it is understood that the resin TE has the highest solubility parameter, and the PDMS or 311RM resin has a lower solubility parameter.

In addition, it is understood that the solvent of chloroform shown in the table has a higher solubility parameter than that of the solvent of hexane, and the material functionalizing the surface of the quantum dots such as oleic acid and trioctylamine ("TOA") has a solubility parameter of about 15, which is slightly higher than that of the hexane solvent but is similar to or lower than the solubility parameter of the chloroform solvent.

As is understood from the following example, four kinds of quantum dot-resin nanocomposites are prepared by associating the resin, the solvent, and the functionalizing the surface of the quantum dots shown in Table 1 according to the solubility parameters, and the particle size and shape of the nanocomposites are shown in Table 2.

Figure 5A:
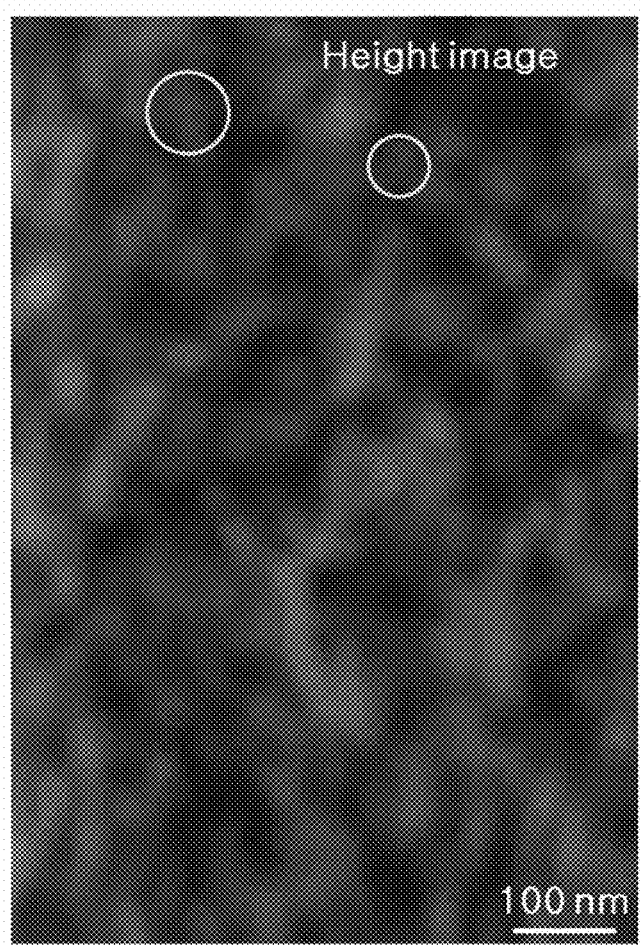
Figure 5B:
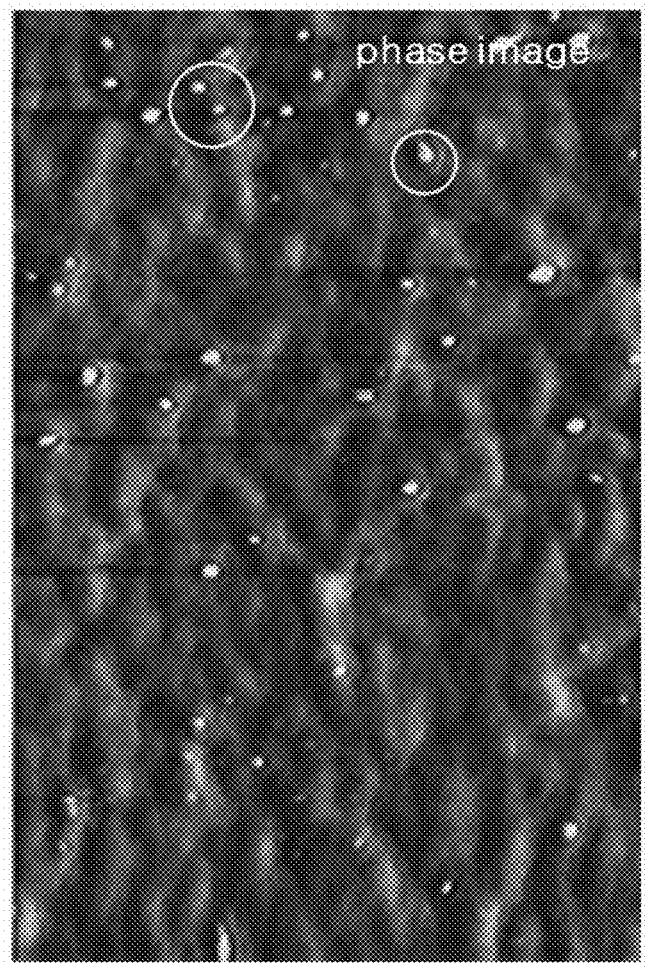

From Table 2, it is understood that when the nanocomposite is prepared by associating the chloroform solvent having the highest solubility parameter, the TE resin having a lower solubility parameter, and the QD having the lowest solubility parameter, the particle size of the nanocomposite is about 40 nm, and the quantum dot-resin nanocomposite in which the QD is impregnated by the resin TE is obtained as expected. FIGS. 5A and 5B show an atomic force microscopic ("AFM") photograph of the film including the nanocomposite obtained therefrom. FIG. 5A is a height image according to the surface height of nanocomposite film, and FIG. 5B is a phase image showing the presence of different phases on the surface. Bright dots shown in FIG. 5B are resin particles encapsulating the quantum dots inside thereof.

FIGS. 6A and 6B and FIGS. 7A and 7B are AFM photographs of films obtained by including the nanoparticles obtained from Example 2 and Example 3, respectively, and in both FIGS. 6A and 6B and FIGS. 7A and 7B, clearer nanocomposite particles are shown.

On the other hand, from Table 2, it is understood that the nanoparticles obtained from Example 2 and Example 3 have a particle size of about 50 nm and about 80 nm, respectively, and the particle size is somewhat increased compared to the particle size of the nanocomposite according to Example 1 in which the QD is encapsulated in the resin.

As shown in FIGS. 5A to 7B, it is understood that the quantum dot-resin nanocomposite obtained from one embodiment well maintains the shape of the nanoparticle as it was initially fabricated even during the process of removing the solvent to provide a film after the fabrication, and it is also well dispersed in the film at a small and uniform size of less than or equal to about 100 nm.

Figure 4:
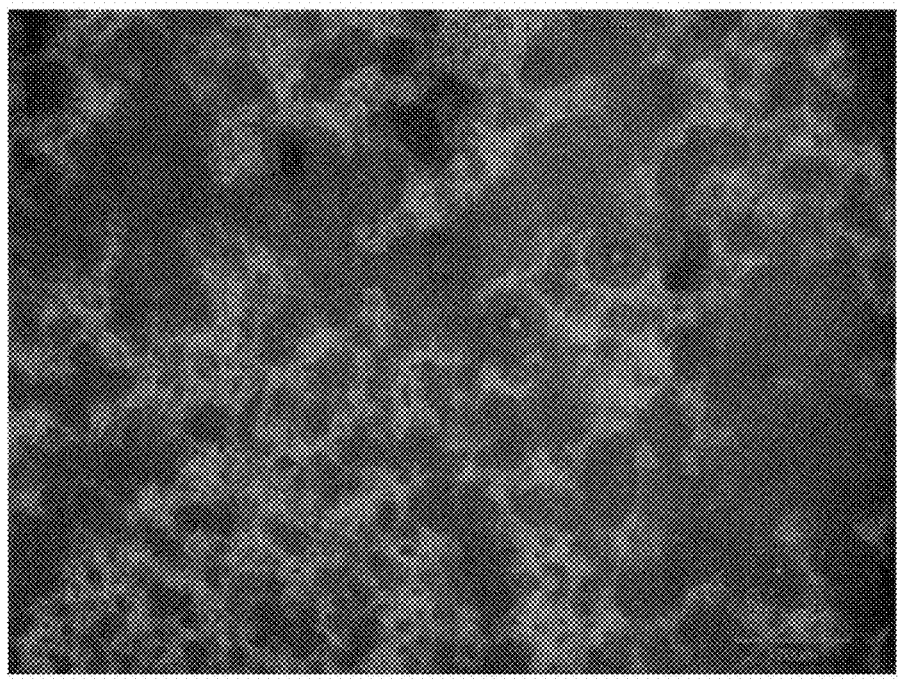
FIG. 4 is an optical microscope photograph showing a film surface, wherein the film is obtained by functionalizing a polymer, NUCREL®, on the surface of quantum dots according to an embodiment and mechanically agitating and dispersing the same in a TE photocurable resin, and molding the same into a film.

On the other hand, FIG. 4 is an optical microscopic photograph of the film, wherein the film is obtained by functionalizing the surface of the quantum dots used in the example with a polymer, e.g., an ethylene methacrylic acid copolymer such as NUCREL®, mechanically mixing the same in the TE photocurable resin, and dispersing and molding the same. As shown in FIG. 4, it is understood that even though the surface of the quantum dots is functionalized with the polymer when the quantum dots are simply dispersed in the resin, the functionalized quantum dots are not well dispersed in the resin and are coagulated with each other to provide a large particle with a size of about 300 μm.

On the other hand, when the quantum dot-resin nanocomposite obtained from the embodiment is fabricated into a molded article such as a film or the like as mentioned above, surprisingly, it is found that the CTE is decreased by greater than or equal to about 30%, by greater than or equal to about 35%, by greater than or equal to about 40%, by greater than or equal to about 45%, or by greater than or equal to about 50%, or about 1% to about 50%, or about 10% to about 40%, compared to the case of fabricating a molded article with only the resin without adding the quantum dots.

An organic material, such as a resin, can have a very high coefficient of thermal expansion compared to that of an inorganic material, which is understood to be an important demerit for limiting the application of the organic material to the light emitting diode or the like which uses heat treatment at a high temperature. In order to solve this, the method of mixing the organic polymer with the inorganic material has been attempted, but a satisfactory CTE decrease effect is not obtained therefrom. However, when the quantum dot-resin nanocomposite is prepared according to the embodiment, the molded article including the same has a significantly decreased CTE compared to the molded article obtained by simply dispersing the quantum dots into a polymer or the molded article including only the resin.

Accordingly, another embodiment of the present invention provides a molded article including the quantum dot-resin nanocomposite, wherein the molded article including the quantum dot-resin nanocomposite has a coefficient of thermal expansion (CTE) that is decreased by greater than or equal to about 30% compared to the molded article including only the curable resin for the nanocomposite.

As is understood from the following examples, the films obtained from the resins including nanocomposites obtained from Examples 1 to 4 have the coefficient of thermal expansion that is decreased by greater than or equal to about 30% compared to the case including only each resin or the film obtained by simply dispersing the quantum dots in the resin. Particularly, when the film is fabricated by simply dispersing the quantum dots in the resin, the CTE is higher by greater than or equal to about 30% compared to the case of fabricating the film with only the resin; but when the film is fabricated by providing the nanocomposite according to Examples 1 to 4 and including the same in the resin, the CTE is decreased by greater than or equal to about 30% compared to the case of fabricating the film with only the resin. Thereby, when comparing this with the case of simply dispersing the QD powder in the resin, it is understood that the CTE may be decreased by a level of greater than or equal to about 50%.

The molded article may be preferably used for fabricating various molded articles requiring heat treatment at a high temperature, due to the decreased CTE, and examples of the molded article may include a film, a substrate for a display, a light emitting diode, or the like, but is not limited thereto.

Hereinafter, the disclosure is further illustrated in more detail with reference to examples. However, these examples are exemplary embodiments and shall not be limiting.

EXAMPLES

Example 1 to 4

Preparation of Quantum Dot-Resin Nanocomposite

InP—ZnS-based greenish QD in which oleic acid ("OA") is disposed on the surface is used as a functionalized quantum dot; chloroform or hexane is used as a solvent; thiolene ("TE") resin consisting of 1,3,5-triallyl-1,3,5-triazine-2,4,6(1H,3H,5H)-trione (Aldrich-Sigma), pentaerythritol tetrakis(3-mercaptopropionate) (Aldrich-Sigma), and an Irgacure754 initiator (BASF), or MINS-311RM (Minuta Technology Co., Ltd., vinyl acrylate-based resin) resin is used as a resin, and a quantum dot-resin nanocomposite is prepared according to the composition shown in the following Table 1.

Specifically, about 500 microliters (4) of a solvent including quantum dots at about 1 wt % based on a total weight of the resin, and 3 g of the resin are first mixed and sufficiently agitated for 30 minutes, and the solvent is removed under a vacuum atmosphere for 1 hour to provide each quantum dot-resin nanocomposite.

The particle size of the quantum dot-resin nanocomposite and the dispersing property of the resin and the QD in the nanocomposite are measured by an atomic force microscope ("AFM"), and the results are shown in the following Table 2.

TABLE 1

| | Solvent | Quantum dot | Resin |
|---|---|---|---|
| Example 1 | chloroform | InP-ZnS surface-functionalized with OA | TE |
| Example 2 | hexane | InP-ZnS surface-functionalized with OA | TE |
| Example 3 | chloroform | InP-ZnS surface-functionalized with OA | MINS-311RM |
| Example 4 | hexane | InP-ZnS surface-functionalized with OA | MINS-311RM |

TABLE 2

| | Nanocomposite size | Shape |
|---|---|---|
| Example 1 | 40 nm | QDs are encapsulated by resin |
| Example 2 | 50 nm | QDs are coated on a surface of resin particle |
| Example 3 | 80 nm | QDs are uniformly dispersed in the resin particle |

Fabrication and Evaluation of Film

The nanocomposite-resin mixture, in which each quantum dot-resin nanocomposite obtained from Examples 1 to 4 is mixed with each resin used in a weight ratio of 20:80, is coated at a thickness of 100 micrometers (μm) between polyethylene terephthalate ("PET") upper and lower substrates leaving a space formed by a spacer and cured through a UV curing machine such as CL-1000, Inocure-System, and the PET upper and lower substrates are removed to provide a nanocomposite-included resin film.

Figure 6A:
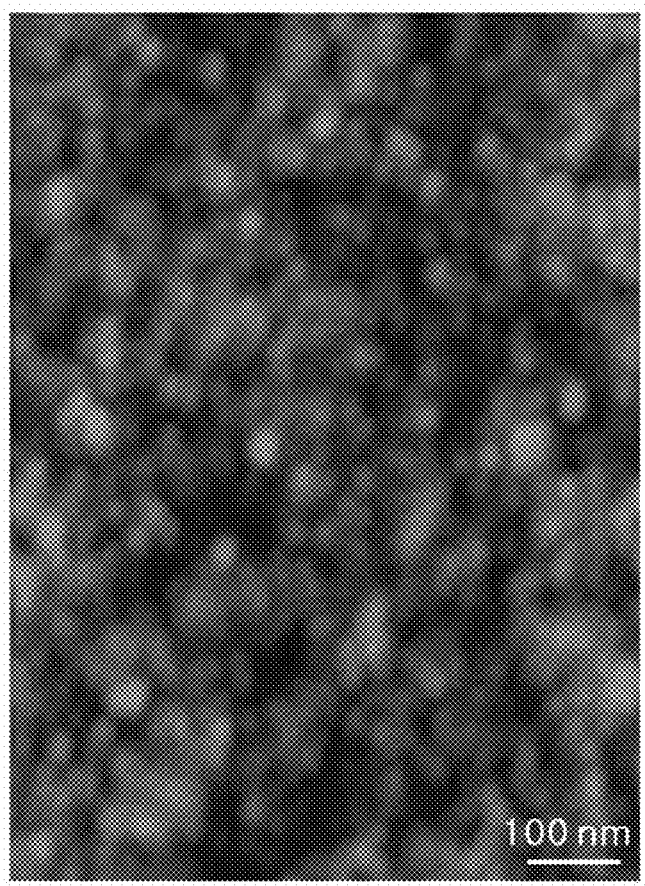
Figure 6B:
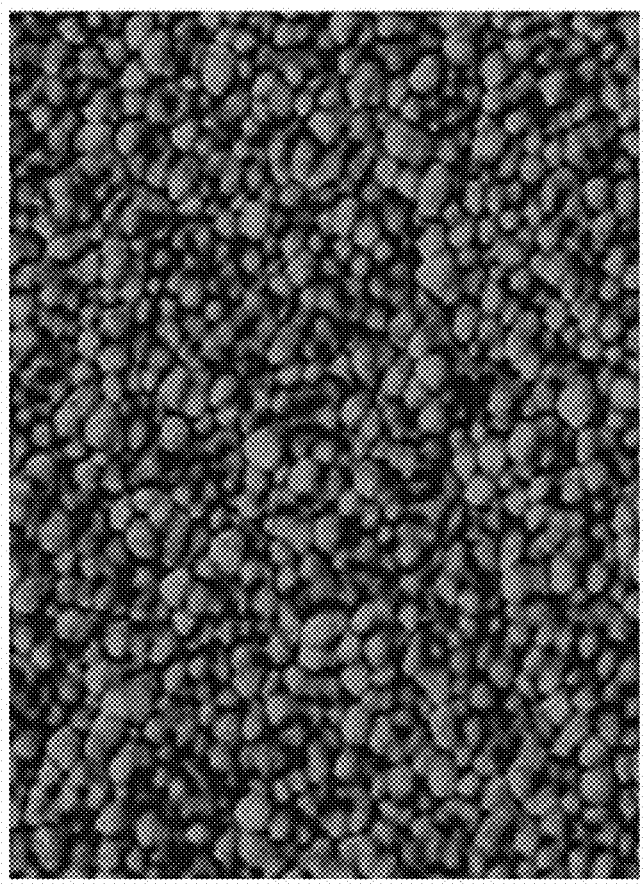
Figure 7A:
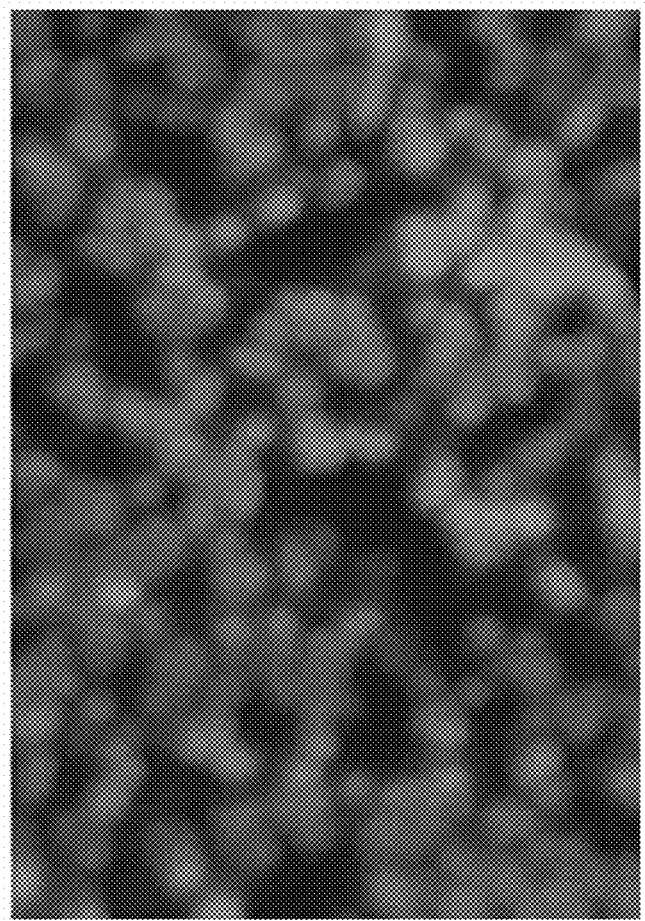
Figure 7B:
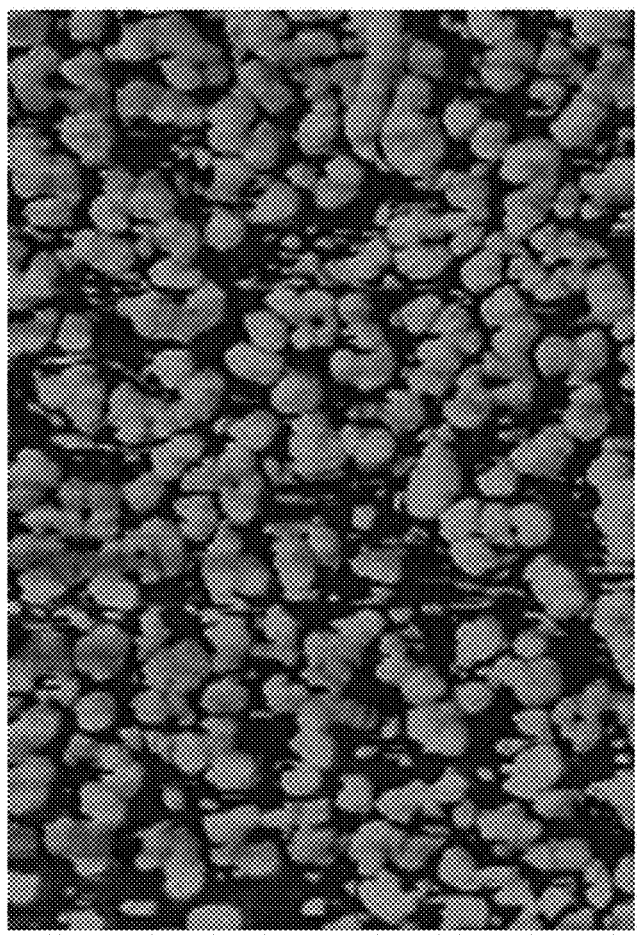

The surface of the obtained film is photographed with an atomic force microscopic ("AFM") and is shown in FIGS. 5 to 7. FIGS. 5A and 5B are photographs showing the surface of the film including the quantum dot-resin nanocomposite obtained from Example 1, FIGS. 6A and 6B are photographs showing the surface of the film including the quantum dot-resin nanocomposite obtained from Example 2, and FIGS. 7A and 7B are photographs showing the surface of film including the quantum dot-resin nanocomposite obtained from Example 3. From the surface photographs, it is confirmed that the quantum dot-resin nanocomposite is uniformly dispersed in the obtained film.

On the other hand, FIG. 4 is an AFM surface photograph of the film obtained from a comparative example in which an ethylene methacrylic acid copolymer polymer, NUCREL® (DuPont), is disposed on the surface of the InP—ZnS quantum dots used in the example and mechanically dispersed in the TE resin in an amount of 20 wt %. In FIG. 4, differing from the film photographs of FIGS. 5 to 7 including the quantum dot-resin nanocomposites obtained from Examples 1 to 3, it is found that the quantum dots are not well dispersed in the film and are coagulated. In this case, the quantum dot coagulate has a size of about 300 μm, which is incomparably higher than the size (less than or equal to about 100 nm) of quantum dot-resin nanocomposite according to the examples, which is dispersed in the film.

In addition, the obtained film is measured for CTE. In this case, for comparison, films obtained by including only TE or 311RM resin or by dispersing the same amount of QD used as in the example in the resin are also measured for CTE. The results are shown in the following Table 3.

TABLE 3

| Film | CTE (ppmK$^{-1}$) |
|---|---|
| TE film alone | 160 |
| QD dispersed TE film | 200 |
| TE film including composite of Example 1 | 125 |
| TE film including composite of Example 2 | 148 |
| 311RM film alone | 136 |
| QD dispersed 311RM film | 181 |
| 311RM film including composite of Example 3 | 84 |
| 311RM film including composite of Example 4 | 110 |

As shown in Table 3, when the film is fabricated using the quantum dot-resin nanocomposite according to Examples 1 to 4, it is confirmed that the CTE of the film is decreased by greater than or equal to about 30%, respectively, compared to the films including only the resin or including the resin containing QDs that are simply dispersed therein. Particularly, when the film is fabricated by simply dispersing the QD in the resin, the CTE is increased by greater than or equal to about 30% compared to the case of fabricating the film with only the resin; on the other hand, when the film is fabricated by including the nanocomposite according to Examples 1 to 4 in the resin, the CTE is decreased by greater than or equal to about 30% compared to the case of fabricating the film with only the resin, so it is understood that the CTE is decreased by greater than or equal to about 50% compared to the case of simply dispersing the QD powder in the resin.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of preparing a quantum dot-resin nanocomposite, the method comprising:
    selecting an organic material to be disposed on a surface of a plurality of quantum dots, a resin, and a solvent;
    contacting the organic material with the surface of the quantum dots to provide functionalized quantum dots;
    combining the functionalized quantum dots, the resin, and the solvent; and
    emulsifying the same to prepare the quantum dot-resin nanocomposite,
    wherein the resin has a solubility parameter greater than a solubility parameter of both the organic material and the solvent, and the organic material has a solubility parameter greater than a solubility parameter of the solvent,
    wherein each of the solvent, the resin, and the organic material has a solubility parameter of about 10 MPa$^{1/2}$ to about 30 MPa$^{1/2}$, respectively,
    wherein the organic material is derived from a compound of the formula RCOOH, RNH$_2$, R$_2$NH, R$_3$N, RSH, R$_3$PO, R$_3$P, ROH, RCOOR', or a combination thereof, wherein R and R' are each independently a C1-C24 alkyl group or a C5-C24 aryl group, and
    wherein the resin comprises a thiolene resin.

2. The method of claim 1, wherein the organic material is a material derived from a thiol, an amine, an acid, a phosphine, or phosphonic acid.

3. The method of claim 2, wherein the thiol is methane thiol, ethane thiol, propane thiol, butane thiol, pentane thiol, hexane thiol, octane thiol, dodecane thiol, hexadecane thiol, octadecane thiol, or benzyl thiol;
    wherein the amine is methyl amine, ethyl amine, propyl amine, butyl amine, pentyl amine, hexyl amine, octyl amine, dodecyl amine, hexadecyl amine, octadecyl amine, dimethyl amine, diethyl amine, or dipropyl amine;
    wherein the acid is methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid;
    wherein the phosphine is methyl phosphine, ethyl phosphine, propyl phosphine, butyl phosphine, pentyl phosphine, methyl phosphine oxide, ethyl phosphine oxide, propyl phosphine oxide, or butyl phosphine; or a diphenyl phosphine, a triphenyl phosphine, or an oxide thereof.

4. A quantum dot-resin nanocomposite prepared from the method of claim 1, wherein the quantum dot-resin nanocomposite comprises a resin nanoparticle, and a plurality of quantum dots contacting the resin nanoparticle, wherein the resin comprises a thiolene resin.

5. The quantum dot-resin nanocomposite of claim 4, wherein the plurality of quantum dots are disposed on a surface of the resin nanoparticle.

6. The quantum dot-resin nanocomposite of claim 4, wherein a particle diameter of the quantum dot-resin nanocomposite is about 20 nanometers to about 5 micrometers.

7. The quantum dot-resin nanocomposite of claim 4, wherein the resin is a curable resin selected from a thermosetting resin or a photocurable resin.

8. A molded article comprising:
a matrix resin; and
a quantum dot-resin nanocomposite of claim 4.

9. The molded article of claim 8, wherein the molded article is a film, a substrate for a display, or a light emitting diode.

10. The molded article of claim 8, wherein the molded article has a coefficient of thermal expansion of equal to or greater than about 84 ppm/K and less than 160 ppm/K.

11. The molded article of claim 8, wherein the molded article has a coefficient of thermal expansion of equal to or greater than about 84 ppm/K and less than or equal to about 148 ppm/K.

12. The molded article of claim 8, wherein the molded article has a coefficient of thermal expansion of equal to or greater than about 84 ppm/K and less than or equal to about 125 ppm/K.

13. The molded article of claim 8, wherein the molded article has a coefficient of thermal expansion of equal to or greater than about 84 ppm/K and less than or equal to about 110 ppm/K.

14. A method of preparing a quantum dot-resin nanocomposite, the method comprising:
selecting an organic material to be disposed on a surface of a plurality of quantum dots, a resin, and a solvent;
contacting the organic material with the surface of the quantum dots to provide functionalized quantum dots;
combining the functionalized quantum dots, the resin, and the solvent; and
emulsifying the same to prepare the quantum dot-resin nanocomposite,
wherein the solvent has a solubility parameter greater than a solubility parameter of both the organic material and the resin, and the organic material has a solubility parameter greater than a solubility parameter of the resin,
wherein each of the solvent, the resin, and the organic material has a solubility parameter of about 10 $MPa^{1/2}$ to about 30 $MPa^{1/2}$, respectively,
wherein the organic material is derived from a compound of the formula RCOOH, $RNH_2$, $R_2NH$, $R_3N$, RSH, $R_3PO$, $R_3P$, ROH, RCOOR', or a combination thereof, wherein R and R' are each independently a C1-C24 alkyl group or a C5-C24 aryl group, and
wherein the resin comprises a thiolene resin.

15. A quantum dot-resin nanocomposite prepared from the method of claim 14,
wherein the quantum dot-resin nanocomposite comprises a resin nanoparticle, and a plurality of quantum dots contacting the resin nanoparticle, and the resin comprises a thiolene resin.

16. The quantum dot-resin nanocomposite of claim 15, wherein the plurality of quantum dots are uniformly dispersed in the resin nanoparticle.

17. A molded article comprising:
a matrix resin; and
a quantum dot-resin nanocomposite of claim 15.

* * * * *